United States Patent
Kumar et al.

(10) Patent No.: US 12,235,730 B1
(45) Date of Patent: Feb. 25, 2025

(54) PRIORITIZING IMPORTANT FILES WHILE RESTORING PROTECTION

(71) Applicant: Dell Products L.P., Round Rock, TX (US)

(72) Inventors: Shiv S. Kumar, Pune (IN); Kaushik Gupta, Pune (IN); Anurag Chandra, Pune (IN)

(73) Assignee: DELL PRODUCTS L.P., Round Rock, TX (US)

( * ) Notice: Subject to any disclaimer, the term of this patent is extended or adjusted under 35 U.S.C. 154(b) by 30 days.

(21) Appl. No.: 18/480,984

(22) Filed: Oct. 4, 2023

(51) Int. Cl.
*G06F 11/14* (2006.01)

(52) U.S. Cl.
CPC ...... *G06F 11/1451* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 8,375,005 B1* | 2/2013 | Claudatos | G06F 16/27 707/649 |
| 2003/0177324 A1* | 9/2003 | Timpanaro-Perrotta | G06F 11/1469 711/158 |
| 2005/0177767 A1* | 8/2005 | Furuya | G06F 11/1456 714/E11.122 |
| 2022/0029803 A1* | 1/2022 | Vijayanarayanan | H04L 9/32 |

* cited by examiner

*Primary Examiner* — Christopher J Raab
(74) *Attorney, Agent, or Firm* — Amin, Turocy & Watson, LLP

(57) ABSTRACT

A system can determine that a node a storage cluster has failed, wherein respective data protection levels are maintained for respective files. The system can traverse the respective files, comprising, in response to determining that a data protection level for a file is degraded and that the file is a priority file, adding an identifier of the file to a priority table for restoration of data protection, or, in response to determining that the data protection level for the file of the respective files is degraded and that the file is not the priority file, adding the identifier of the file to a non-priority table for the restoration of data protection. The system can, after traversing the files, restore respective first data protection levels of respective first files represented by the priority table, and then restore respective second data protection levels of respective second files represented by the non-priority table.

20 Claims, 17 Drawing Sheets

600

(602)

DETERMINING THAT A NODE OF A GROUP OF STORAGE NODES OF A STORAGE CLUSTER HAS FAILED, WHEREIN THE STORAGE CLUSTER STORES A GROUP OF FILES, AND WHEREIN RESPECTIVE DATA PROTECTION LEVELS ARE MAINTAINED FOR RESPECTIVE FILES OF THE GROUP OF FILES 604

TRAVERSING THE RESPECTIVE FILES, COMPRISING: IN RESPONSE TO DETERMINING THAT A DATA PROTECTION LEVEL FOR A FILE OF THE RESPECTIVE FILES IS DEGRADED, AND IN RESPONSE TO DETERMINING THAT THE FILE IS A PRIORITY FILE, ADDING AN IDENTIFIER OF THE FILE TO A PRIORITY TABLE FOR RESTORATION OF DATA PROTECTION, OR IN RESPONSE TO DETERMINING THAT THE DATA PROTECTION LEVEL FOR THE FILE OF THE RESPECTIVE FILES IS DEGRADED, AND IN RESPONSE TO DETERMINING THAT THE FILE IS NOT THE PRIORITY FILE, ADDING THE IDENTIFIER OF THE FILE TO A NON-PRIORITY TABLE FOR THE RESTORATION OF DATA PROTECTION 606

AFTER TRAVERSING THE RESPECTIVE FILES, RESTORING RESPECTIVE FIRST DATA PROTECTION LEVELS OF RESPECTIVE FIRST FILES OF THE GROUP OF FILES REPRESENTED BY THE PRIORITY TABLE 608

AFTER RESTORING THE RESPECTIVE FIRST DATA PROTECTION LEVELS OF THE RESPECTIVE FIRST FILES, RESTORING RESPECTIVE SECOND DATA PROTECTION LEVELS OF RESPECTIVE SECOND FILES OF THE GROUP OF FILES REPRESENTED BY THE NON-PRIORITY TABLE 610

PRIORITIZING IMPORTANT FILES WHILE RESTORING PROTECTION

BACKGROUND

Computer systems can store computer data. In doing so, a computer system can apply varying levels of data protection to the computer data.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine that a node of a group of storage nodes of a storage cluster has failed, wherein the storage cluster stores a group of files, and wherein respective data protection levels are maintained for respective files of the group of files. The system can traverse the respective files, comprising, in response to determining that a data protection level for a file of the respective files is degraded, and in response to determining that the file is a priority file, adding an identifier of the file to a priority table for restoration of data protection, or, in response to determining that the data protection level for the file of the respective files is degraded, and in response to determining that the file is not the priority file, adding the identifier of the file to a non-priority table for the restoration of data protection. The system can, after traversing the respective files, restore respective first data protection levels of respective first files of the group of files represented by the priority table. The system can, after restoring the respective first data protection levels of the respective first files, restore respective second data protection levels of respective second files of the group of files represented by the non-priority table.

An example method can comprise, based on a node of a group of storage nodes has failed, wherein the group of storage nodes stores files, and wherein respective data protection levels are maintained for respective files of the files, evaluating, by a system comprising a processor, the respective files, comprising, for each file of the respective files: based on determining that a data protection level for the file is degraded, and in response to determining that the file is a priority file, adding an identifier of the file to a priority table usable to restore data protection, or based on determining that the data protection level for the file is degraded, and in response to determining that the file is not the priority file, adding the identifier of the file to a non-priority table for usable to restore data protection. The method can further comprise, after evaluating the respective files, restoring, by the system, respective first data protection levels of respective first files added to the priority table. The method can further comprise, after restoring the respective first data protection levels of the respective first files, restoring respective second data protection levels of respective second files added to the non-priority table.

An example non-transitory computer-readable medium can comprise instructions that, in response to execution, cause a system comprising a processor to perform operations. These operations can comprise, based on determining that a node of a group of storage nodes has failed, wherein the group of storage nodes stores files, and wherein respective data protection levels are maintained for respective files of the files, examining the respective files, wherein based on determining that a corresponding data protection level for a file of the respective files is degraded, and based on determining that the file is a priority file, adding an identifier of the file to a priority group for restoring data protection for priority files, and based on determining that the corresponding data protection level for the file of the respective files is degraded, and based on determining that the file is not the priority file, adding the identifier of the file to a normal group for restoring data protection for normal files having a lower priority than priority files. These operations can further comprise, after examining the respective files, restoring respective first data protection levels of respective first files of the priority group before restoring respective second data protection levels of respective second files of the normal group.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3 illustrates an example process flow for identifying priority files and normal files for restoring data protection, and that can facilitate prioritizing important files while restoring protection, in accordance with an embodiment of this disclosure;

FIG. 6 illustrates an example process flow that can facilitate prioritizing important files while restoring protection, in accordance with an embodiment of this disclosure;

DETAILED DESCRIPTION

Overview

Figure 1:
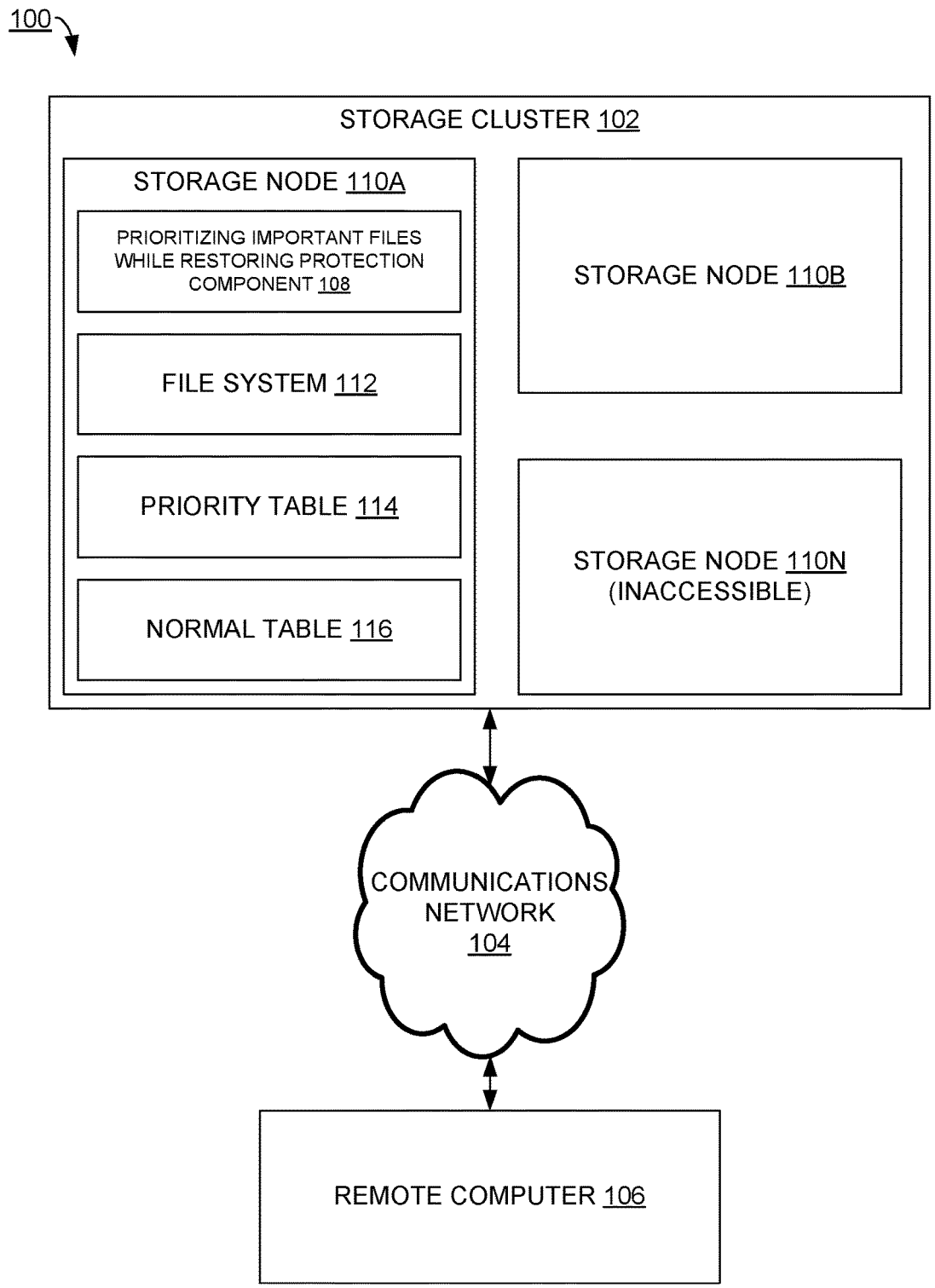
FIG. 1 illustrates an example system architecture that can facilitate prioritizing important files while restoring protection, in accordance with an embodiment of this disclosure.

A computing cluster can provide computer data storage resources to one or more users. It can be that, at times, the total storage available on the cluster is not enough to honor the protection specified on a logical inode (LIN). A LIN can generally comprise a data structure stored in a file system that uniquely identifies each file within a file system, and that stores attributes of a file and corresponding locations of disk blocks that store the file's data.

For example, there can be a 6-node cluster, which has storage that is approximately 70-80% full. It can be that a node failure at this point does not cause any data loss. However, it can be that the cluster is not able to honor a level of data protection specified on every LIN.

As a data protection job traverses through LINs, it can identify whether the LIN has any block on a failed node and marks them appropriately. In a next phase, these LINs can be repaired (e.g., have a specified protection level restored) to honor the specified protection level.

There can be a possibility that, by the time the traversal reaches an important file, there is not enough storage left to honor the specified protection.

It can be with prior approaches that there is not a way to honor the protection of important files first, thus utilizing the available space more efficiently. In short, prior approaches can lack an ability to identify and repair (e.g., restore a protection level) important files first.

In some examples, the present techniques can be implemented as follows. While traversing LINs, a data protection job distinguish between important and files that are not designated as important (which can be referred to as "normal files" or "less-important files"). That is, in a second phase (when the files are repaired), the important files can be received and repaired first, before the normal files.

Distinguishing between important files and normal files can be performed as follows. An external attribute metadata can be maintained for each important file, which designates the file as important. In some examples, this external attribute can be a Boolean attribute named priority_file.

A priority_file external attribute can be set to false by default (that is, it can be that files are deemed to be normal files unless they are designated as important files). The external attribute can be set to true under various conditions, such as a user marks a file as important, an important user reads or updates the file, or the file is more frequently accessed than other files.

Where a user marks a file as important, a user can set the external attribute for files that the user wants to mark as important.

Where an important user reads or updates the file, this can involve an administrator marking certain users as important. Then, when a file operation from an important user is received by a protocol driver that is configured to effectuate file operations on a file system, the protocol driver can set a priority_file attribute that corresponds to the file to true, upon successful execution of the file operation.

In some examples, the protocol driver can maintain a list of important users in memory. When a user is newly designated as being important, the protocol driver can receive a signal hang up (SIGHUP) message indicative of this, and update its in-memory data structures to identify this newly-designated important user. That is, the protocol drivers can reconfigure its respective config and transfer the config information to memory. Put another way, config information can be persisted in storage, and then propagated to memory for quick access.

It can then be that each completion callback (e.g., for file accesses) can check if the user is part of the important users list. Where the user is not important, it can be that the file operation concludes without further operations. If the user is important, the file is marked as important.

Determining that a file is important because it is frequently accessed can be implemented as follows. Metadata for a file, such as an external attribute, access_count, can be initialized to zero and maintained, in a similar manner as priority_file. When a file is read or modified, its corresponding access_count value can be incremented when that file operation is successful. This attribute can be checked by a protection job.

A protection job according to the present techniques can be implemented as follows. The protection job can add the LINs that need repair into a database (which can be named lin_repair_db). lin_repair_db can comprise two tables-priority_lins and regular_lins.

The protection job, in a first phase, can identify LINs that are to be repaired.

Where a priority_file is set for a LIN that is to be repaired, that LIN can be added to a priority_lins table. Otherwise (where priority_file is false), if an access_count external attribute is greater than N (which can be a configurable threshold value that can be based on system workload), the LIN can be added to the priority_lins table. Otherwise (where access_count is not greater than N), the LIN can be added to the regular_lins table.

In some examples, access_count can be reset to zero for each LIN that is repaired.

The protection job, in a second phase, can repair protection for LINs identified in the priority_lins table before repairing protection for LINs identified in the regular_lins table. In this manner, prioritizing important files while restoring protection can be effectuated.

Example Architectures

FIG. 1 illustrates an example system architecture 100 that can facilitate prioritizing important files while restoring protection, in accordance with an embodiment of this disclosure.

System architecture 100 comprises storage cluster 102, communications network 104, and remote computer 106. In turn, storage cluster 102 comprises storage node 110A, storage node 110B, and storage node 110N (indicating that there can be examples with an arbitrary number of storage nodes, while three storage nodes are depicted here). Further in turn, storage node 110A comprises prioritizing important files while restoring protection component 108, file system 112, priority table 114, and normal table 116. It can be appreciated that there can be examples where other storage nodes also comprise one or more of these components found in storage node 110A.

Figure 17:
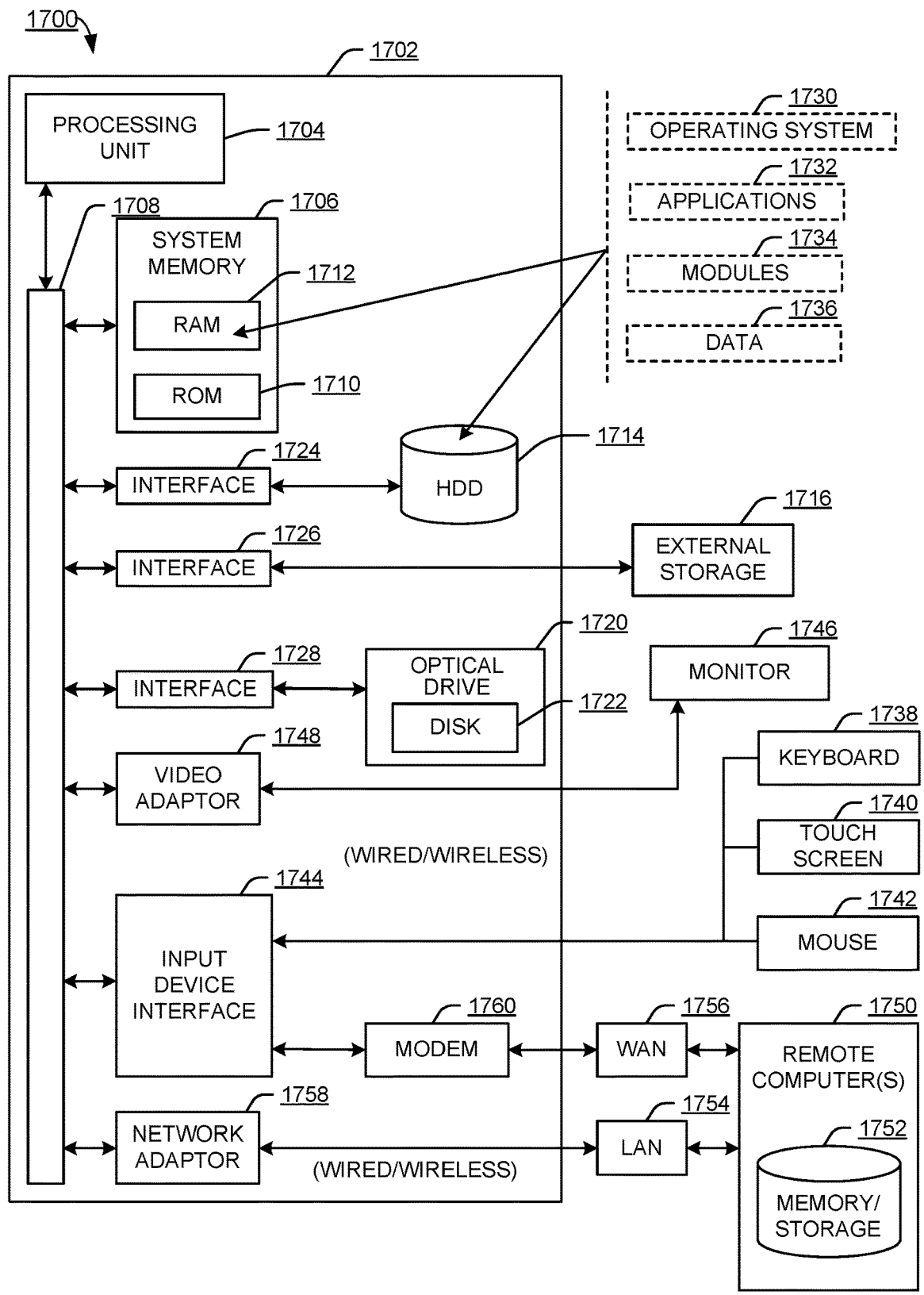
FIG. 17 illustrates an example block diagram of a computer operable to execute an embodiment of this disclosure.

Each of storage cluster 102 (including individual storage nodes) and/or remote computer 106 can be implemented with part(s) of computing environment 1700 of FIG. 17. Communications network 104 can comprise a computer communications network, such as the Internet.

Storage cluster 102 can store and provide access to computer data in file system 112, such as by servicing data read and write requests received from remote computer 106 via communications network 104. As part of reading and/or writing data, storage cluster 102 protect the data (e.g. files) from data loss by implementing data protection. Data protection can comprise storing multiple copies of a given file on different storage nodes, so a failure of one storage node does not result in a loss of the file. It can be that different data has different data protection levels—e.g., it can be that some data is stored only as one copy, some data is stored with two copies (on two separate nodes), and some data is stored with more than two copies (on more than two nodes).

When data protection is degraded (which is shown here as storage node 110N becoming inaccessible, where storage node 110N stores copies of some data in file system 112), prioritizing important files while restoring protection component 108 can restore the data protection (e.g., by storing new copies of the data that was on storage node 110N in another storage node of storage cluster 102, where copies are not otherwise currently stored).

Prioritizing important files while restoring protection component 108 can analyze files of file system 112 to see (a) whether data protection of a given file has become degraded, and (b) whether the file is a priority file. Where prioritizing important files while restoring protection component 108 determines that both data protection of a given file has become degraded and the file is a priority file, prioritizing important files while restoring protection component 108 can store an indication of that file in priority table 114. Where prioritizing important files while restoring protection component 108 determines that data protection of a given file has become degraded but that the file is not a priority file (which can be referred to as a non-priority file, or a normal file), prioritizing important files while restoring protection component 108 can store an indication of that file in normal table 116.

Each of priority table 114 and normal table 116 can comprise a data structure that stores indications of files in file system 112, such as a file system path to the file or an identification of a logical inode (LIN) associated with the file.

In restoring data protection, prioritizing important files while restoring protection component 108 can first restore data protection of files identified in priority table 114. After completing that, prioritizing important files while restoring protection component 108 can then restore data protection of files identified in normal table 116. In this manner, prioritizing important files while restoring protection can be effectuated.

In some examples, prioritizing important files while restoring protection component 108 can implement part(s) of the process flows of FIGS. 4-16 to implement prioritizing important files while restoring protection.

It can be appreciated that system architecture 100 is one example system architecture for prioritizing important files while restoring protection, and that there can be other system architectures that facilitate prioritizing important files while restoring protection.

Figure 2:
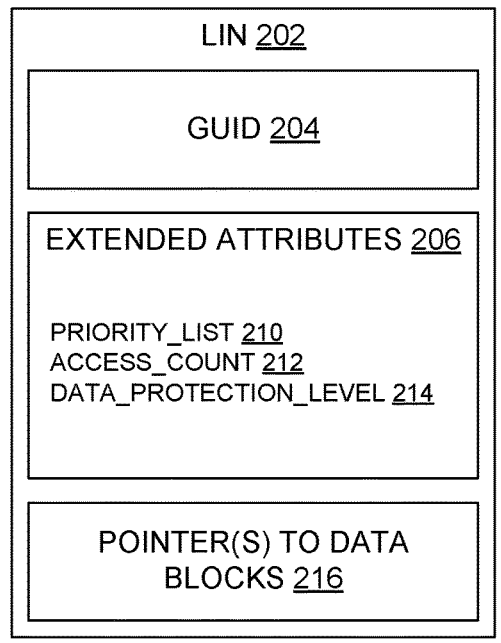
FIG. 2 illustrates an example file architecture including a LIN that can facilitate prioritizing important files while restoring protection, in accordance with an embodiment of this disclosure.

FIG. 2 illustrates an example system architecture 200 including a LIN that can facilitate prioritizing important files while restoring protection, in accordance with an embodiment of this disclosure. In some examples, part(s) of system architecture 200 can be used to implement part(s) of system architecture 100 of FIG. 1 to facilitate prioritizing important files while restoring protection.

System architecture 200 comprises LIN 202 and prioritizing important files while restoring protection component 208 (which can be similar to prioritizing important files while restoring protection component 108 of FIG. 1). LIN 202 comprises globally unique identifier (GUID) 204, extended attributes 206 (including priority_file 210, access_count 212, and data_protection_level 214), and pointer(s) to data blocks 216.

In some examples, multiple instances of LIN 202 can be stored in file system 112 of FIG. 1 to maintain files. GUID 204 can comprise a number that uniquely identifies LIN 202 among other LINs in file system 112. Extended attributes 206 can comprise name-value pairs for metadata about a corresponding file. Here, there are three extended attributes depicted.

Priority_file 210 can store a Boolean value (e.g., TRUE or FALSE) that indicates whether the file is a priority file. Access_count 212 can store an integer that indicates a number of times the file has been accessed, where frequently-accessed files can be determined to be priority files even where priority_file 210 indicates that the file is not a priority file. In some examples, a value of access_count 212 can be reset to 0 when data protection of the corresponding file is restored (or in other situations). Data_protection_level 214 can identify a level of data protection being implemented for the file (e.g., that the file is to be mirrored or not-mirrored).

Pointer(s) to data blocks 216 can identify one or more data blocks stored on disk (e.g., a computer storage disk of storage node 110A of FIG. 1) that store file data for the corresponding file.

Prioritizing important files while restoring protection component 208 can use the information in LIN 202 to facilitate prioritizing important files while restoring protection. For example, prioritizing important files while restoring protection component 208 can access data_protection_level 214 to indicate an intended level of data protection. Where, prioritizing important files while restoring protection component 208 determines that that data protection level is not currently met, prioritizing important files while restoring protection component 208 can determine to restore the data protection level.

Where a data protection level is to be restored for the file, prioritizing important files while restoring protection component 208 can determine from priority_file 210 and/or access_count 212 whether the file is a priority file. Where the file is a priority file, prioritizing important files while restoring protection component 208 can store an indication of the file (e.g., the value of GUID 204) to priority table 114 of FIG. 1. Where the file is not a priority file, prioritizing important files while restoring protection component 208 can store an indication of the file to normal table 116 of FIG. 1.

Figure 3:
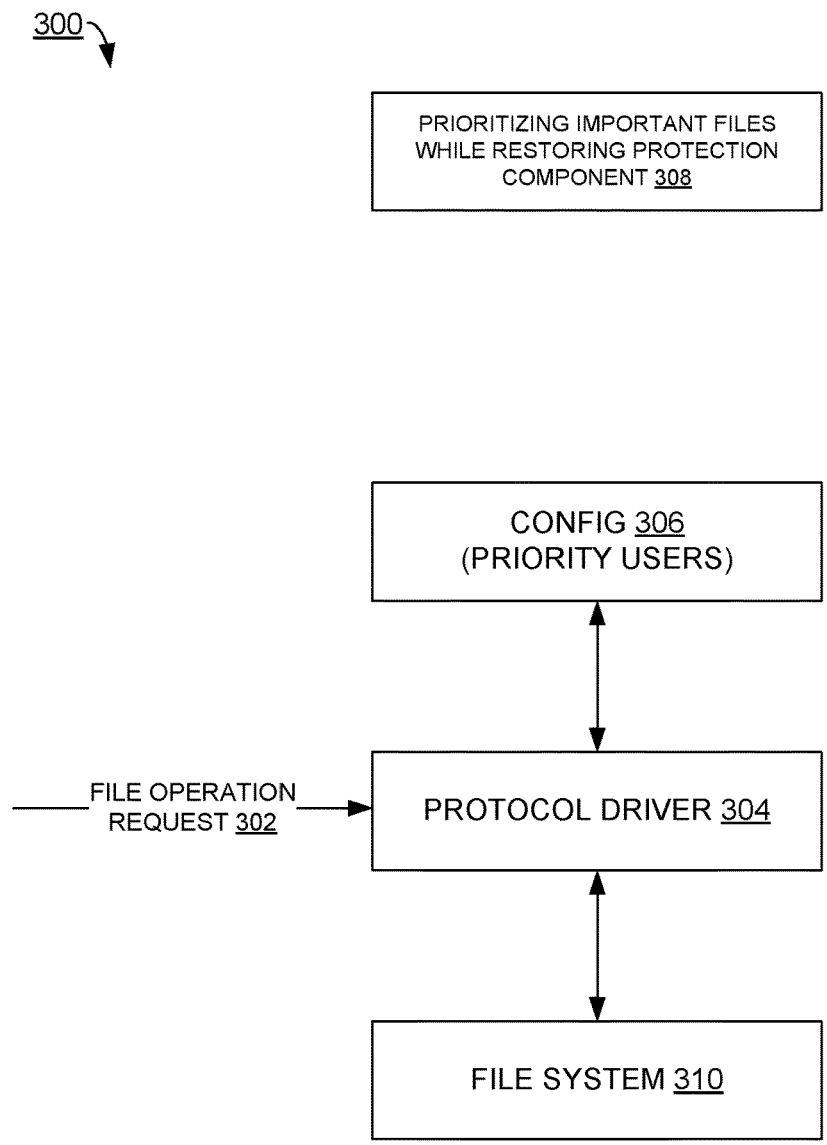
FIG. 3 illustrates an example system architecture 300 including a protocol driver that can facilitate prioritizing important files while restoring protection, in accordance with an embodiment of this disclosure.

FIG. 3 illustrates an example system architecture 300 including a protocol driver that can facilitate prioritizing important files while restoring protection, in accordance with an embodiment of this disclosure. In some examples, part(s) of system architecture 200 can be used to implement part(s) of system architecture 100 of FIG. 1 to facilitate prioritizing important files while restoring protection.

System architecture 300 comprises file operation request 302, protocol driver 304, config 306 (priority users), prioritizing important files while restoring protection component 308 (which can be similar to prioritizing important files while restoring protection component 108 of FIG. 1), and file system 310 (which can be similar to file system 112).

Using the example of FIG. 1, file operation request 302 can comprise a request (e.g., to read or modify) a file of file system 112 that is received at storage node 110A from remote computer 106. In the example of FIG. 3, file operation request 302 can be received by protocol driver 304, which can be configured to effectuate file system operations on file system 310. Upon successful completion of file operation request 302 on file system 310, file system 310 can send a callback to protocol driver 304 indicating success.

Protocol driver 304 can then access config 306 (priority users) (which can be a data structure stored in memory that identifies priority users). Where config 306 identifies a user that requested file operation request 302 as being a priority user, protocol driver can mark that file as being a priority file. Using the example of FIG. 2, this can comprise accessing LIN 202 that corresponds to file operation request 302, and setting priority_file 210 as TRUE.

When prioritizing important files while restoring protection component 308 restores data protection, prioritizing important files while restoring protection component 308 can use these indications of priority files generated by protocol driver 304 to identify priority files have data protection restored before non-priority files.

Example Process Flows

Figure 4:
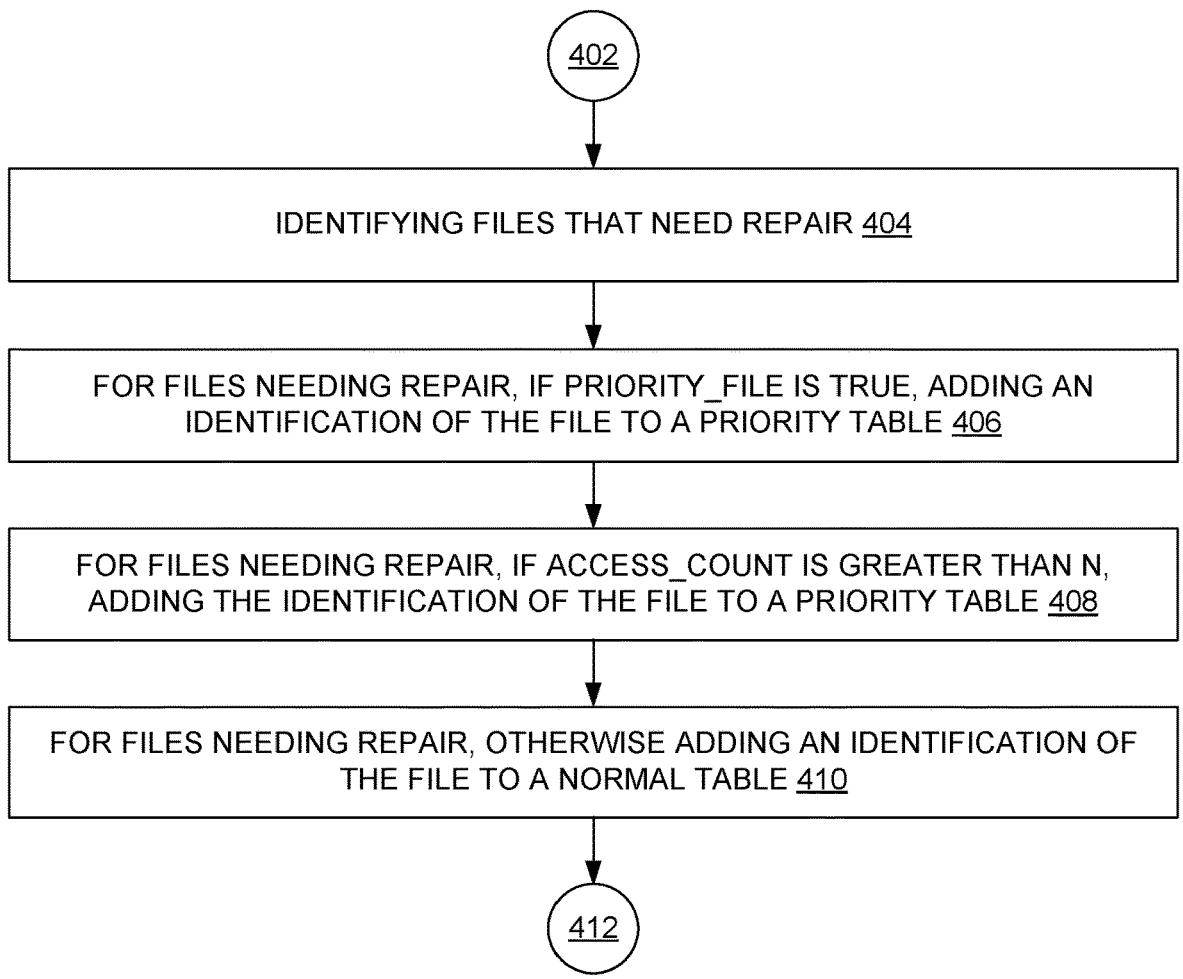
FIG. 4 illustrates an example process flow that can facilitate prioritizing important files while restoring protection, in accordance with an embodiment of this disclosure.

FIG. 4 illustrates an example process flow 400 that can facilitate prioritizing important files while restoring protection, in accordance with an embodiment of this disclosure. In some examples, one or more embodiments of process flow 400 can be implemented by prioritizing important files while restoring protection component 108 of FIG. 1, or computing environment 1700 of FIG. 17.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of the process flows of FIGS. 5-16.

Process flow 400 begins with 402, and moves to operation 404.

Operation 404 depicts identifying files that need repair. This can comprise evaluating files stored in storage cluster 102, and for files that indicate a level of data protection that is not currently in effect (e.g., a data protection level indicated by data_protection_level 214 of FIG. 2), identifying such files as files that need repair.

After operation 404, process flow 400 moves to operation 406.

Operation 406 depicts, for files needing repair, if priority_file is TRUE, adding an identification of the file to a priority table. Priority_file can be similar to priority_file 210 of FIG. 2. The priority table can be similar to priority table 114 of FIG. 1.

After operation 406, process flow 400 moves to operation 408.

Operation 408 depicts, for files needing repair, if access_count is greater than N, adding the identification of the file to a priority table. Access_count can be similar to access_count 212 of FIG. 2, and N can be an integer value that can be set to indicate a threshold number of accesses that cause a file to be considered a priority file (even when priority_file does not otherwise indicate the file as being a priority file).

In some examples, operation 408 can be implemented where priority_file is FALSE in operation 406 (and skipped where priority_file is TRUE).

After operation 408, process flow 400 moves to operation 410.

Operation 410 depicts, for files needing repair, otherwise adding an identification of the file to a normal table. The normal table can be similar to normal table 116 of FIG. 1.

In some examples, operation 410 can be implemented where priority_file is FALSE in operation 406 and access_count<=N in operation 408 (and skipped where either priority_file is TRUE, or access_count>N).

After operation 410, process flow 400 moves to 412, where process flow 400 ends.

Figure 5:
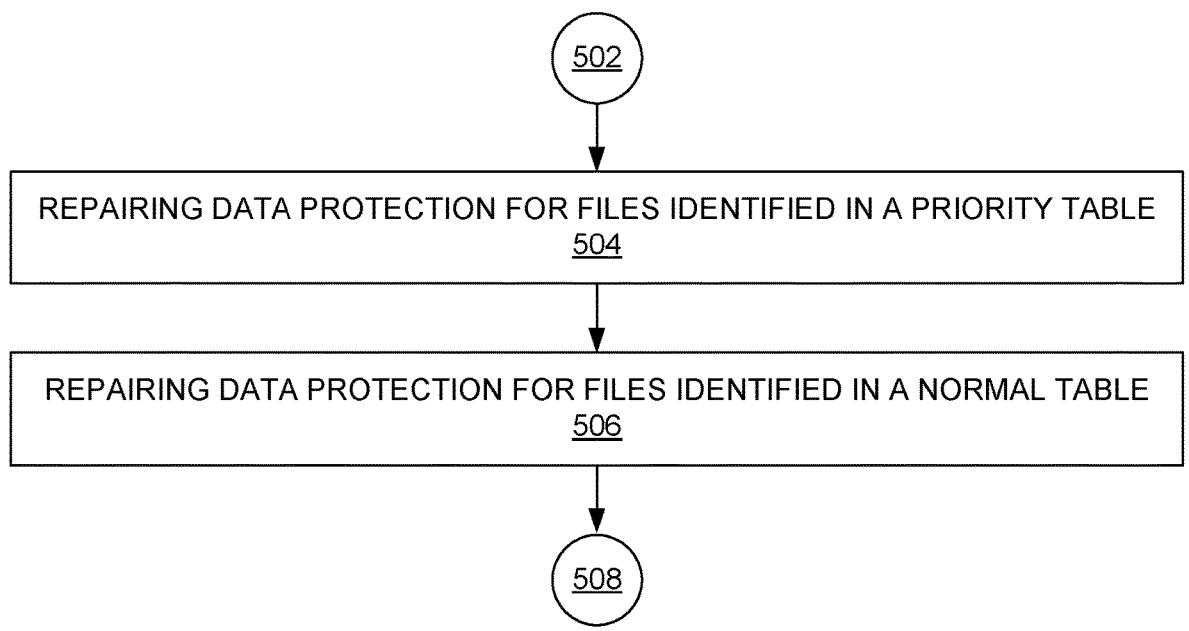
FIG. 5 illustrates an example process flow that can facilitate prioritizing important files while restoring protection, in accordance with an embodiment of this disclosure.

FIG. 5 illustrates another example process flow 500 that can facilitate prioritizing important files while restoring protection, in accordance with an embodiment of this disclosure. In some examples, one or more embodiments of process flow 500 can be implemented by prioritizing important files while restoring protection component 108 of FIG. 1, or computing environment 1700 of FIG. 17.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of the process flows of FIG. 4 or 6-16.

Process flow 500 begins with 502, and moves to operation 504.

Operation 504 depicts repairing data protection for files identified in a priority table. The priority table can be similar to priority table 114 of FIG. 1, and prioritizing important files while restoring protection component 108 can repair data protection for these files.

After operation 504, process flow 500 can move to operation 506.

Operation 506 depicts repairing data protection for files identified in a normal table. The priority table can be similar to normal table 116 of FIG. 1, and prioritizing important files while restoring protection component 108 can repair data protection for these files. This can be done after repairing data protection for files identified in priority table 114. In this manner of a two-stage repairing process where the repairing of some files is prioritized over the repairing of other files, prioritizing important files while restoring protection can be effectuated.

FIG. 6 illustrates another example process flow 600 that can facilitate prioritizing important files while restoring protection, in accordance with an embodiment of this disclosure. In some examples, one or more embodiments of process flow 600 can be implemented by prioritizing important files while restoring protection component 108 of FIG. 1, or computing environment 1700 of FIG. 17.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of the process flows of FIG. 4-5 or 7-16.

Process flow 600 begins with 602, and moves to operation 604.

Operation 604 depicts determining that a node of a group of storage nodes of a storage cluster has failed, wherein the storage cluster stores a group of files, and wherein respective data protection levels are maintained for respective files of the group of files. Using the example of FIG. 1, there can be storage cluster 102, where storage node N 110N has failed, and wherein storage cluster 102 stores files such as in file system 112.

After operation 604, process flow 600 moves to operation 606.

Operation 606 depicts traversing the respective files, comprising: in response to determining that a data protection level for a file of the respective files is degraded, and in response to determining that the file is a priority file, adding an identifier of the file to a priority table for restoration of data protection, or in response to determining that the data protection level for the file of the respective files is degraded, and in response to determining that the file is not the priority file, adding the identifier of the file to a non-priority table for the restoration of data protection. That is, using the example of FIGS. 1-2, files of file system 112 can be traversed (so as to examine each file being considered for data protection repair). Where data_protection_level 214 indicates a higher data protection level than currently being maintained, and priority_file 210 (or access_count 212) indicates that the file is a priority file, then an indication of that file can be added to priority table 114. Otherwise, where degraded data protection is identified and the file is not identified as a priority file, an indication of the file can be added to normal table 116.

In some examples, the determining that the file is the priority file comprises determining that the file is the priority file based on an external attribute of the file that indicates whether the file is the priority file. This can be similar to priority_file 210 of FIG. 2.

In some examples, the external attribute stores a Boolean value, and wherein the Boolean value indicates whether the file is the priority file. That is, a value of priority_file 210 of FIG. 2 can be TRUE (indicating that it is a priority file) or FALSE (indicating that it is not a priority file).

In some examples, a default value of the Boolean value is false, and wherein the Boolean value is set to true based on determining that the file is the priority file. That is, files can start with a default that they are not priority files, and this can be changed to indicate that they are priority files. In other examples, a default of the Boolean value can be no value, where no value indicates that the file is not a priority file.

After operation 606, process flow 600 moves to operation 608.

Operation 608 depicts, after traversing the respective files, restoring respective first data protection levels of respective first files of the group of files represented by the priority table. Continuing with the example of FIG. 1, this can comprise restoring a data protection level of files identified in priority table 114.

After operation 608, process flow 600 moves to operation 610.

Operation 610 depicts, after restoring the respective first data protection levels of the respective first files, restoring respective second data protection levels of respective second files of the group of files represented by the non-priority table. Continuing with the example of FIG. 1, this can comprise restoring a data protection level of files identified in normal table 116, where this is performed after restoring a data protection of priority files identified in priority table 114.

After operation 610, process flow 600 moves to 612, where process flow 600 ends.

Figure 7:
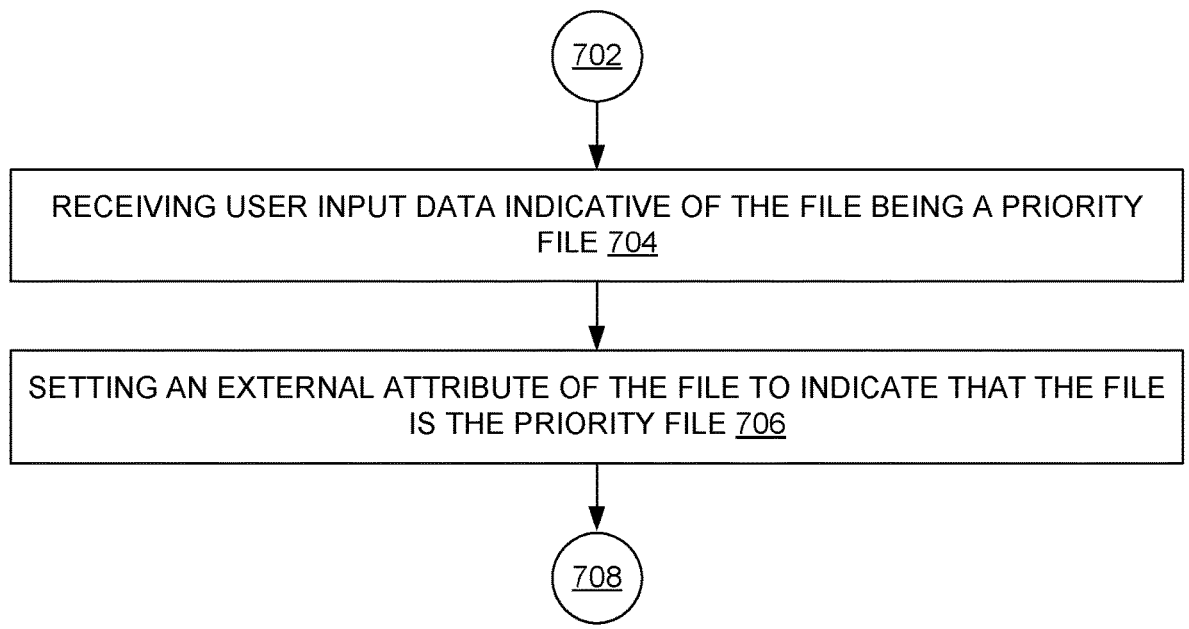
FIG. 7 illustrates an example process flow that can facilitate prioritizing important files while restoring protection, in accordance with an embodiment of this disclosure.

FIG. 7 illustrates another example process flow 700 that can facilitate prioritizing important files while restoring protection, in accordance with an embodiment of this disclosure. In some examples, one or more embodiments of process flow 700 can be implemented by prioritizing important files while restoring protection component 108 of FIG. 1, or computing environment 1700 of FIG. 17.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of the process flows of FIG. 4-6 or 8-16.

Process flow 700 begins with 702, and moves to operation 704.

Operation 704 depicts receiving user input data indicative of the file being a priority file. This can be user input data received from an administrator account of storage cluster 102 of FIG. 1.

After operation 704, process flow 700 moves to operation 706.

Operation 706 depicts setting an external attribute of the file to indicate that the file is the priority file. This can comprise setting a value of priority_file 210 of FIG. 2 (that corresponds to the file) to TRUE (or where the value is already TRUE, maintaining that value).

In some examples, operations 704-706 combine to comprise setting the external attribute of the file to indicate that the file is the priority file based on receiving user input data indicative of the file being the priority file.

After operation 706, process flow 700 moves to 708, where process flow 700 ends.

Figure 8:
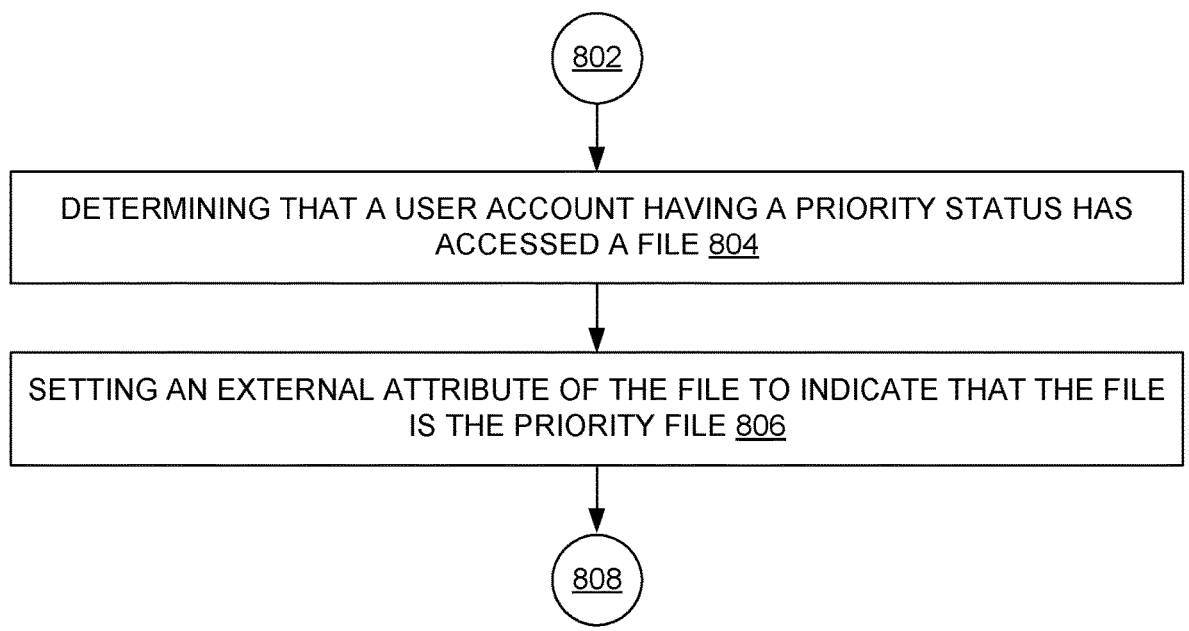
FIG. 8 illustrates an example process flow that can facilitate prioritizing important files while restoring protection, in accordance with an embodiment of this disclosure.

FIG. 8 illustrates another example process flow 800 that can facilitate prioritizing important files while restoring protection, in accordance with an embodiment of this disclosure. In some examples, one or more embodiments of process flow 800 can be implemented by prioritizing important files while restoring protection component 108 of FIG. 1, or computing environment 1700 of FIG. 17.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of the process flows of FIG. 4-7 or 9-16.

Process flow 800 begins with 802, and moves to operation 804.

Operation 804 depicts determining that a user account having a priority status has accessed a file. This can be performed by a protocol driver, such as described with respect to FIG. 3.

In some examples, this can comprise determining that the user account has the priority status based on the user account being identified in a stored identification of user accounts having the priority status. In some examples, the priority status is set for the user account having the priority status by an administrator account of the system. That is, a list of priority user accounts can be maintained (such as by an administrator of a storage cluster), and then when a priority user account accesses a file, that file can be marked as being a priority file.

After operation 804, process flow 800 moves to operation 806.

Operation 806 depicts setting an external attribute of the file to indicate that the file is the priority file. This can be performed in a similar manner as operation 704 of FIG. 7.

In some examples, operations 804-806 combine to comprise setting the external attribute of the file to indicate that the file is the priority file based on determining that a user account having a priority status has accessed the file.

After operation 806, process flow 800 moves to 808, where process flow 800 ends.

Figure 9:
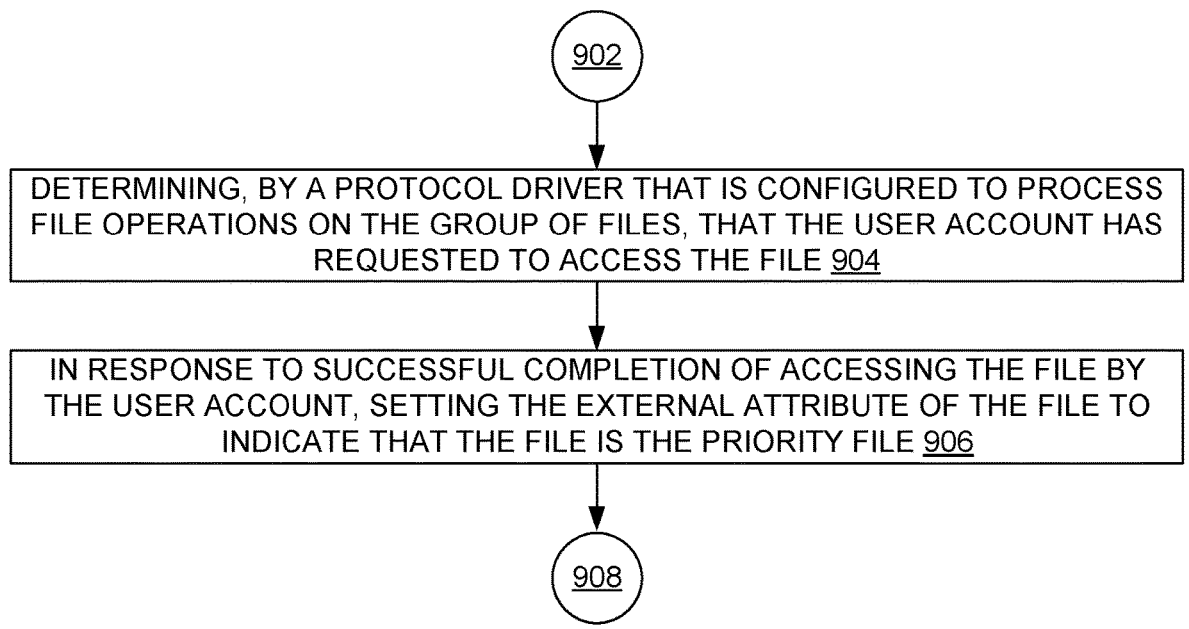
FIG. 9 illustrates an example process flow that can facilitate prioritizing important files while restoring protection, in accordance with an embodiment of this disclosure.

FIG. 9 illustrates another example process flow 900 that can facilitate prioritizing important files while restoring protection, in accordance with an embodiment of this disclosure. In some examples, one or more embodiments of process flow 900 can be implemented by prioritizing important files while restoring protection component 108 of FIG. 1, or computing environment 1700 of FIG. 17.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of the process flows of FIG. 4-8 or 10-16.

Process flow 900 begins with 902, and moves to operation 904.

Operation 904 depicts determining, by a protocol driver that is configured to process file operations on the group of files, that the user account has requested to access the file. This can be performed in a similar manner as described with respect to FIG. 3, where protocol driver 304 receives file operation request 302.

In some examples, a memory that stores computer-executable instructions is a first memory, and the protocol driver stores a stored identification of user accounts having the priority status in a second memory of the protocol driver. This can be performed in a similar manner as described with respect to FIG. 3.

After operation 904, process flow 900 moves to operation 906.

Operation 906 depicts, in response to successful completion of accessing the file by the user account, setting the external attribute of the file to indicate that the file is the priority file. This can comprise protocol driver 304 of FIG. 3 receiving a callback indicating request of a file system operation, and as a result, setting an external attribute (as described with respect to FIG. 2) indicating that the file is a priority file.

After operation 906, process flow 900 moves to 908, where process flow 900 ends.

Figure 10:
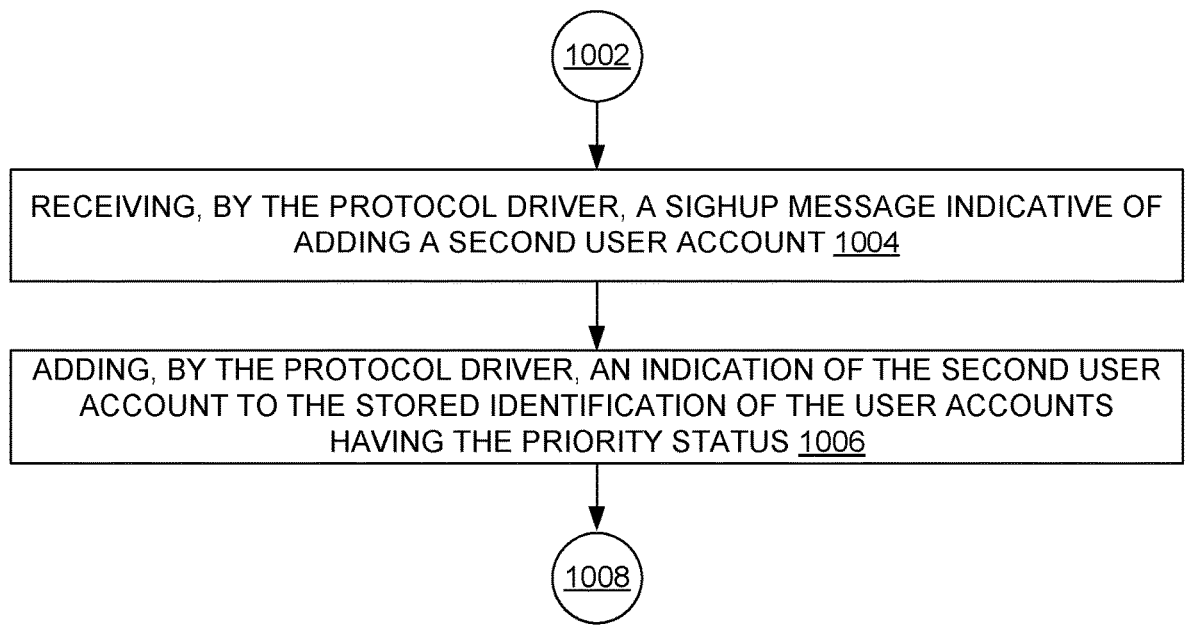
FIG. 10 illustrates an example process flow that can facilitate prioritizing important files while restoring protection, in accordance with an embodiment of this disclosure.

FIG. 10 illustrates another example process flow 1000 that can facilitate prioritizing important files while restoring protection, in accordance with an embodiment of this disclosure. In some examples, one or more embodiments of process flow 1000 can be implemented by prioritizing important files while restoring protection component 108 of FIG. 1, or computing environment 1700 of FIG. 17.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of the process flows of FIG. 4-9 or 11-16.

In some examples, process flow 1000 can be implemented in conjunction with process flow 900 of FIG. 9, where the user account is a first account.

Process flow 1000 begins with 1002, and moves to operation 1004.

Operation 1004 depicts receiving, by the protocol driver, a SIGHUP message indicative of adding a second user account. This can be performed in a similar manner as described with respect to FIG. 3.

After operation 1004, process flow 1000 moves to operation 1006.

Operation 1006 depicts adding, by the protocol driver, an indication of the second user account to the stored identification of the user accounts having the priority status. This can be performed in a similar manner as described with respect to FIG. 3.

In some examples, operations 1004-1006 combine to comprise adding, by the protocol driver, an indication of a second user account to the stored identification of the user accounts having the priority status based on the protocol driver receiving a SIGHUP message indicative of adding the second user account.

After operation 1006, process flow 1000 moves to 1008, where process flow 1000 ends.

Figure 11:
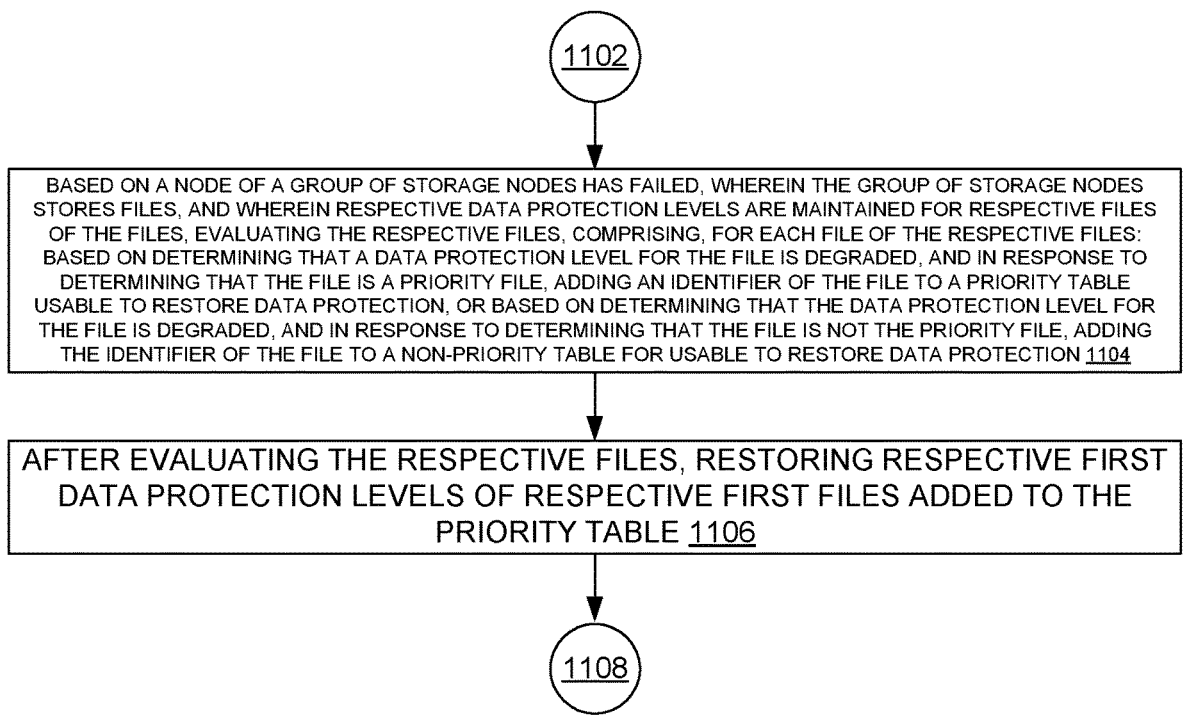
FIG. 11 illustrates an example process flow that can facilitate prioritizing important files while restoring protection, in accordance with an embodiment of this disclosure.

FIG. 11 illustrates another example process flow 1100 that can facilitate prioritizing important files while restoring protection, in accordance with an embodiment of this disclosure. In some examples, one or more embodiments of process flow 1100 can be implemented by prioritizing important files while restoring protection component 108 of FIG. 1, or computing environment 1700 of FIG. 17.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of the process flows of FIG. 4-10 or 12-16.

Process flow 1100 begins with 1102, and moves to operation 1104.

Operation 1104 depicts, based on a node of a group of storage nodes has failed, wherein the group of storage nodes stores files, and wherein respective data protection levels are maintained for respective files of the files, evaluating the respective files, comprising, for each file of the respective files: based on determining that a data protection level for the file is degraded, and in response to determining that the file is a priority file, adding an identifier of the file to a priority table usable to restore data protection, or based on determining that the data protection level for the file is degraded, and in response to determining that the file is not the priority file, adding the identifier of the file to a non-priority table for usable to restore data protection. In some examples, operation 1104 can be implemented in a similar manner as operations 604-606 of FIG. 6.

After operation 1104, process flow 1100 moves to operation 1106.

Operation 1106 depicts, after evaluating the respective files, restoring respective first data protection levels of respective first files added to the priority table. In some examples, operation 1106 can be implemented in a similar manner as operation 608 of FIG. 6.

After operation 1106, process flow 1100 moves to operation 1108.

Operation 1108 depicts, after restoring the respective first data protection levels of the respective first files, restoring respective second data protection levels of respective second files added to the non-priority table. In some examples, operation 1108 can be implemented in a similar manner as operation 610 of FIG. 6.

After operation 1108, process flow 1100 moves to 1110, where process flow 1100 ends.

Figure 12:
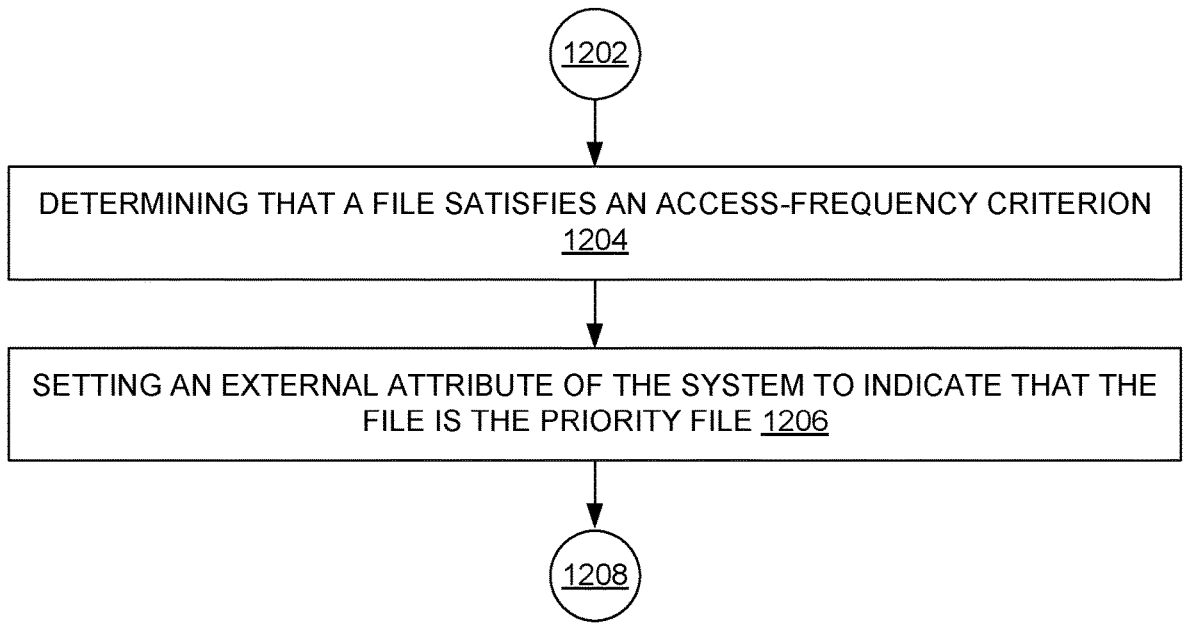
FIG. 12 illustrates an example process flow that can facilitate prioritizing important files while restoring protection, in accordance with an embodiment of this disclosure.

FIG. 12 illustrates another example process flow 1200 that can facilitate prioritizing important files while restoring protection, in accordance with an embodiment of this disclosure. In some examples, one or more embodiments of process flow 1200 can be implemented by prioritizing important files while restoring protection component 108 of FIG. 1, or computing environment 1700 of FIG. 17.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of the process flows of FIG. 4-11 or 13-16.

In some examples, process flow 1200 can be implemented to facilitate the evaluating for each file in operation 1104 of FIG. 11.

Process flow 1200 begins with 1202, and moves to operation 1204.

Operation 1204 depicts determining that a file satisfies an access-frequency criterion. In some examples, operation 1204 comprises the determining that the file is the priority file is performed based on a value of an external attribute of the file that indicates a number of times that the file has been accessed is greater than a threshold number. In some examples, this can comprise maintaining an extended attribute access_count (such as described with respect to FIG. 2), and incrementing a value of access_count each time the file is accessed.

After operation 1204, process flow 1200 moves to operation 1206.

Operation 1206 depicts setting an external attribute of the system to indicate that the file is the priority file. In some examples, this can comprise maintaining an extended attribute priority_file (such as described with respect to FIG. 2), and setting a value of priority_file to TRUE (or maintaining it at TRUE)

In some examples, operations 1204-1206 combine to comprise setting an external attribute of the system to indicate that the file is the priority file based on the file satisfying an access-frequency criterion.

After operation 1206, process flow 1200 moves to 1208, where process flow 1200 ends.

Figure 13:
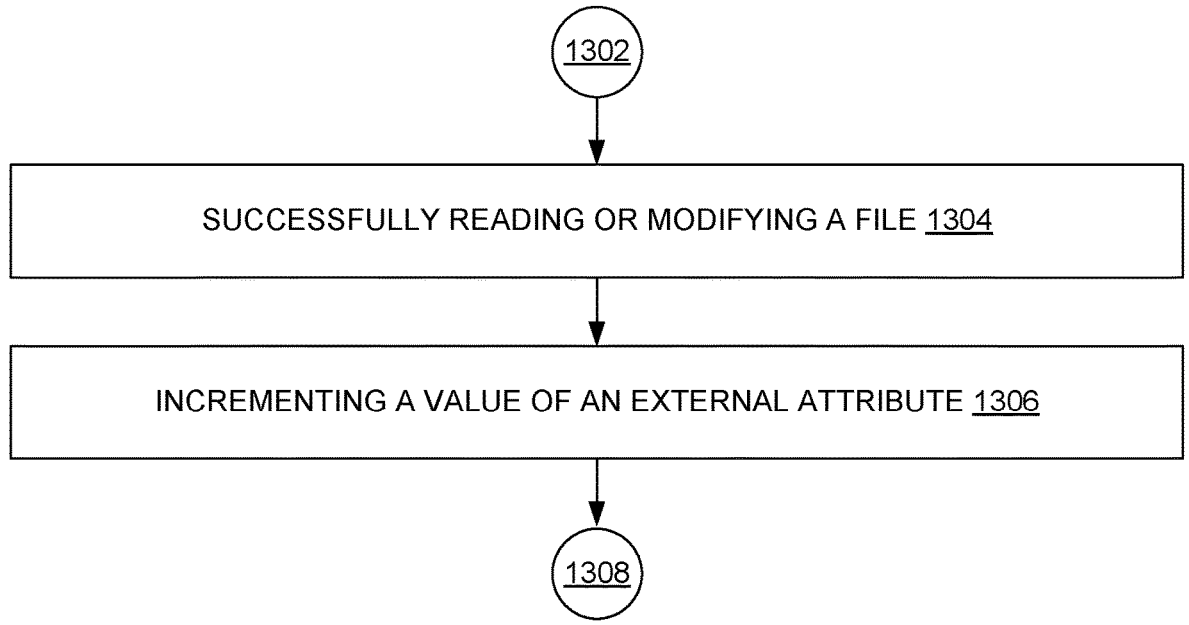
FIG. 13 illustrates an example process flow that can facilitate prioritizing important files while restoring protection, in accordance with an embodiment of this disclosure.

FIG. 13 illustrates another example process flow 1300 that can facilitate prioritizing important files while restoring protection, in accordance with an embodiment of this disclosure. In some examples, one or more embodiments of process flow 1300 can be implemented by prioritizing important files while restoring protection component 108 of FIG. 1, or computing environment 1700 of FIG. 17.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of one or more of the process flows of FIG. 4-12 or 14-16.

In some examples, process flow 1300 can be implemented in conjunction with process flow 1200 of FIG. 12.

Process flow 1300 begins with 1302, and moves to operation 1304.

Operation 1304 depicts successfully reading or modifying a file. This can comprise a protocol driver (such as described with respect to FIG. 3) receiving a callback indicating that a file operation on the file succeeded.

After operation 1304, process flow 1300 moves to operation 1306.

Operation 1306 depicts incrementing a value of an external attribute. This can be an access_count external attribute (such as described with respect to FIG. 2), and incrementing the value can comprise increasing the value by 1.

In some examples, operations 1304-1306 combine to comprise incrementing the value of the external attribute based on successfully reading or modifying the file.

After operation 1306, process flow 1300 moves to 1308, where process flow 1300 ends.

Figure 14:
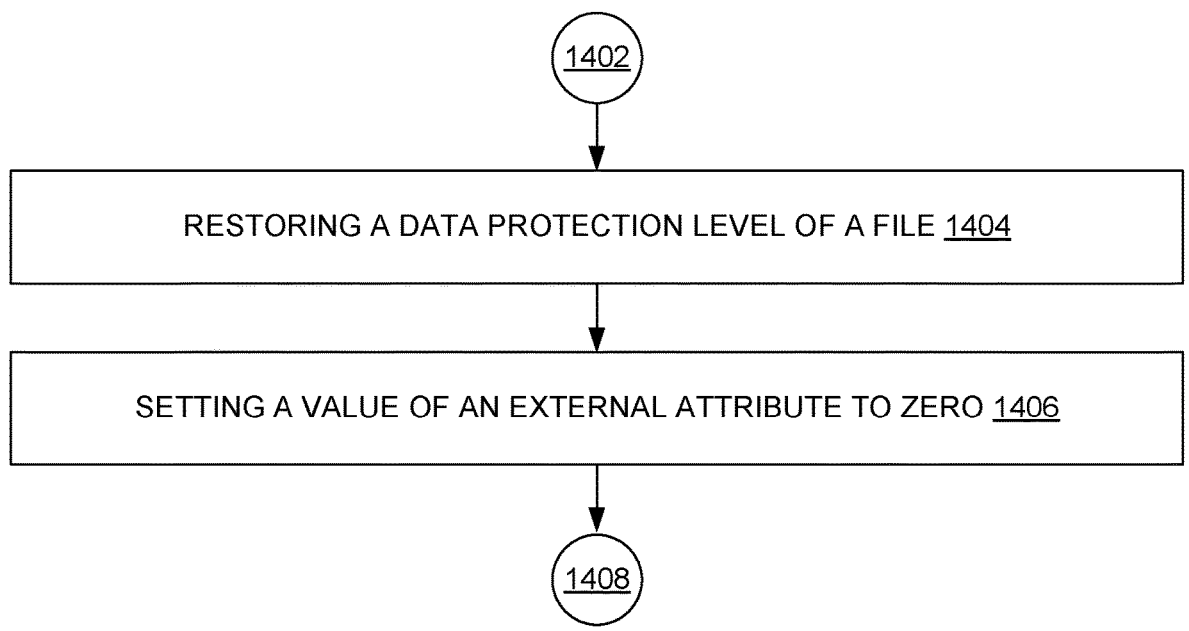
FIG. 14 illustrates an example process flow that can facilitate prioritizing important files while restoring protection, in accordance with an embodiment of this disclosure.

FIG. 14 illustrates another example process flow 1400 that can facilitate prioritizing important files while restoring protection, in accordance with an embodiment of this disclosure. In some examples, one or more embodiments of process flow 1400 can be implemented by prioritizing important files while restoring protection component 108 of FIG. 1, or computing environment 1700 of FIG. 17.

It can be appreciated that the operating procedures of process flow 1400 are example operating procedures, and that there can be embodiments that implement more or fewer operating procedures than are depicted, or that implement the depicted operating procedures in a different order than as depicted. In some examples, process flow 1400 can be implemented in conjunction with one or more embodiments of one or more of the process flows of FIG. 4-13 or 15.

In some examples, process flow 1400 can be implemented in conjunction with process flow 1300 of FIG. 13.

Process flow 1400 begins with 1402, and moves to operation 1404.

Operation 1404 depicts restoring a data protection level of a file. This can comprise, for example, where a data protection level indicates a number of mirrored copies of the file to be stored on separate storage nodes, creating that many copies of the file.

After operation 1404, process flow 1400 moves to operation 1406.

Operation 1406 depicts setting a value of an external attribute to zero. This can be an access_count external attribute (such as described with respect to FIG. 2), where setting the value to zero indicates that the file has not been accessed since it most recently had its data protection level restored.

In some examples, operations 1404-1306 combine to comprise setting the value of the external attribute to zero based on restoring a second data protection level of the file.

After operation 1406, process flow 1400 moves to 1408, where process flow 1400 ends.

Figure 15:
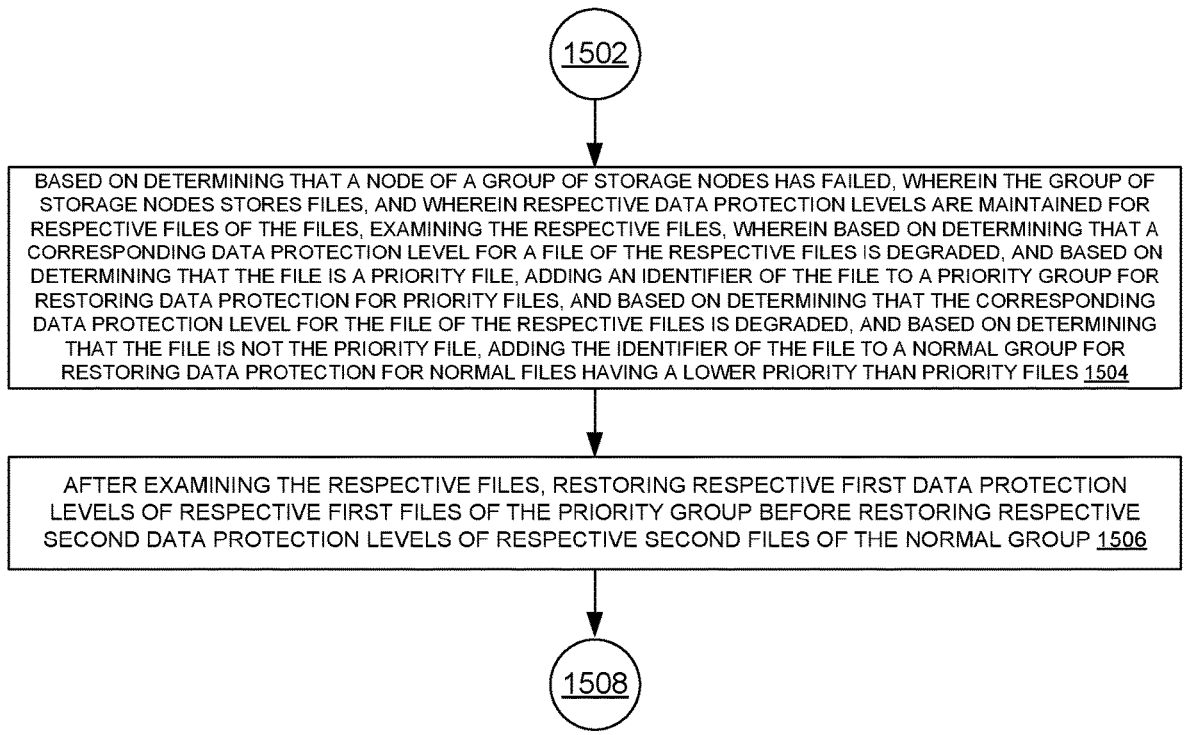
FIG. 15 illustrates an example process flow that can facilitate prioritizing important files while restoring protection, in accordance with an embodiment of this disclosure.

FIG. 15 illustrates another example process flow 1500 that can facilitate prioritizing important files while restoring protection, in accordance with an embodiment of this disclosure. In some examples, one or more embodiments of process flow 1500 can be implemented by prioritizing important files while restoring protection component 108 of FIG. 1, or computing environment 1700 of FIG. 17.

It can be appreciated that the operating procedures of process flow 1500 are example operating procedures, and that there can be embodiments that implement more or fewer operating procedures than are depicted, or that implement the depicted operating procedures in a different order than as depicted. In some examples, process flow 1500 can be implemented in conjunction with one or more embodiments of one or more of the process flows of FIG. 4-14 or 16.

Process flow 1500 begins with 1502, and moves to operation 1504.

Operation 1504 depicts, based on determining that a node of a group of storage nodes has failed, wherein the group of storage nodes stores files, and wherein respective data protection levels are maintained for respective files of the files, examining the respective files, wherein based on determining that a corresponding data protection level for a file of the respective files is degraded, and based on determining that the file is a priority file, adding an identifier of the file to a priority group for restoring data protection for priority files, and based on determining that the corresponding data protection level for the file of the respective files is degraded, and based on determining that the file is not the priority file, adding the identifier of the file to a normal group for restoring data protection for normal files having a lower priority than priority files. In some examples, operation 1504 can be implemented in a similar manner as operations 604-606 of FIG. 6.

In some examples determining that the corresponding data protection level for the file of the respective files is degraded comprises examining a logical inode that corresponds to the file, wherein the logical inode comprises a data structure that identifies attributes of the file and disk block locations of the file. That is, in a system architecture that utilizes LINs to store files, LINs can be evaluated as part of prioritizing important files while restoring protection.

After operation 1504, process flow 1500 moves to operation 1506.

Operation 1506 depicts, after examining the respective files, restoring respective first data protection levels of respective first files of the priority group before restoring respective second data protection levels of respective second files of the normal group. In some examples, operation 1506 can be implemented in a similar manner as operations 608-610 of FIG. 6.

After operation 1506, process flow 1500 moves to 1508, where process flow 1500 ends.

Figure 16:
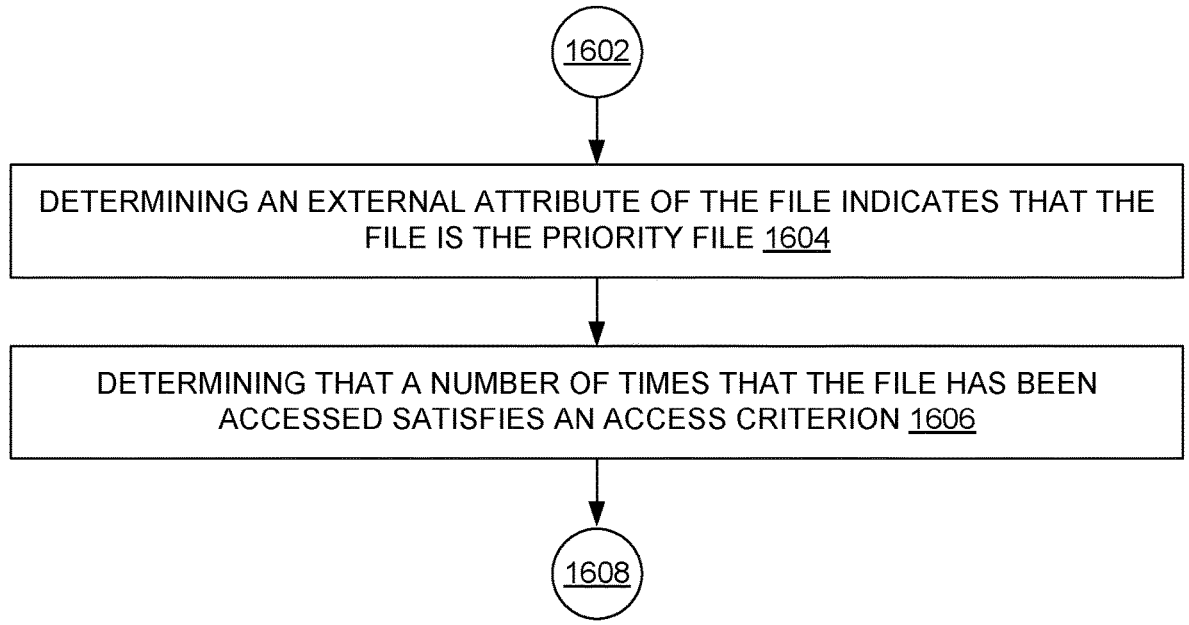

FIG. 16 illustrates an example process flow 1600 for identifying priority files and normal files for restoring data protection, and that can facilitate prioritizing important files while restoring protection, in accordance with an embodiment of this disclosure. In some examples, one or more embodiments of process flow 1600 can be implemented by prioritizing important files while restoring protection component 108 of FIG. 1, or computing environment 1700 of FIG. 17.

It can be appreciated that the operating procedures of process flow 1600 are example operating procedures, and that there can be embodiments that implement more or fewer operating procedures than are depicted, or that implement the depicted operating procedures in a different order than as depicted. In some examples, process flow 1600 can be implemented in conjunction with one or more embodiments of one or more of the process flows of FIGS. 4-15.

In some examples, process flow 1600 can be implemented to facilitate determining that the file is the priority file in operation 1504 of FIG. 15.

Process flow 1600 begins with 1602, and moves to operation 1604.

Operation 1604 depicts determining an external attribute of the file indicates that the file is the priority file. This can be similar to extended attribute priority_file 210 of FIG. 2.

After operation 1604, process flow 1600 moves to operation 1606.

Operation 1606 depicts determining that a number of times that the file has been accessed satisfies an access criterion. This can be similar to extended attribute access_count 212 of FIG. 2. That is, there can be examples where, if at least one of operation 1604 and operation 1606 is satisfied, the file is determined to be a priority file.

In some examples, the external attribute is a first external attribute, and a second external attribute identifies the number of times that the file has been accessed. That is, there can be multiple different extended attributes used, such as both priority_file and access_count.

After operation 1606, process flow 1600 moves to 1608, where process flow 1600 ends.

Example Operating Environment

In order to provide additional context for various embodiments described herein, FIG. 17 and the following discussion are intended to provide a brief, general description of a suitable computing environment 1700 in which the various embodiments of the embodiment described herein can be implemented.

For example, parts of computing environment 1700 can be used to implement one or more embodiments of storage cluster 102 and/or remote computer 106 of FIG. 1.

In some examples, computing environment 1700 can implement one or more embodiments of the process flows of FIGS. 4-16 to facilitate prioritizing important files while restoring protection.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a nonvolatile storage such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

The computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and an optical disk drive 1720 (e.g., which can read or write from a CD-ROM disc, a DVD, a BD, etc.). While the internal HDD 1714 is illustrated as located within the computer 1702, the internal HDD 1714 can also be configured for external use in a suitable chassis (not shown). Additionally, while not shown in environment 1700, a solid state drive (SSD) could be used in addition to, or in place of, an HDD 1714. The HDD 1714, external storage device(s) 1716 and optical disk drive 1720 can be connected to the system bus 1708 by an HDD interface 1724, an external storage interface 1726 and an optical drive interface 1728, respectively. The interface 1724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/wireless connectivity to a local area network (LAN) 1754 and/or larger networks, e.g., a wide area network (WAN) 1756. Such LAN and WAN networking environments are commonplace in offices and companies, and facilitate enterprise-wide computer networks, such as intranets, all of which can connect to a global communications network, e.g., the Internet.

When used in a LAN networking environment, the computer 1702 can be connected to the local network 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the Internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/storage device 1752. It will be appreciated that the network connections shown are examples, and other means of establishing a communications link between the computers can be used.

When used in either a LAN or WAN networking environment, the computer 1702 can access cloud storage systems or other network-based storage systems in addition to, or in place of, external storage devices 1716 as described above. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      determining that a node of a group of storage nodes of a storage cluster has failed, wherein the storage cluster stores a group of files, and wherein respective data protection levels are maintained for respective files of the group of files;
      traversing the respective files, comprising:
         in response to determining that a data protection level for a file of the respective files is degraded, and in response to determining that the file is a priority file, adding an identifier of the file to a priority table for restoration of data protection, or
         in response to determining that the data protection level for the file of the respective files is degraded, and in response to determining that the file is not the priority file, adding the identifier of the file to a non-priority table for the restoration of data protection;
      after traversing the respective files, restoring respective first data protection levels of respective first files of the group of files represented by the priority table; and
      after restoring the respective first data protection levels of the respective first files, restoring respective second data protection levels of respective second files of the group of files represented by the non-priority table.

2. The system of claim 1, wherein the determining that the file is the priority file comprises determining that the file is the priority file based on an external attribute of the file that indicates whether the file is the priority file.

3. The system of claim 2, wherein the external attribute stores a Boolean value, and wherein the Boolean value indicates whether the file is the priority file.

4. The system of claim 3, wherein a default value of the Boolean value is false, and wherein the Boolean value is set to true based on determining that the file is the priority file.

5. The system of claim 2, wherein the operations further comprise:
setting the external attribute of the file to indicate that the file is the priority file based on receiving user input data indicative of the file being the priority file.

6. The system of claim 2, wherein the operations further comprise:
setting the external attribute of the file to indicate that the file is the priority file based on determining that a user account having a priority status has accessed the file.

7. The system of claim 6, wherein the operations further comprise:
determining that the user account has the priority status based on the user account being identified in a stored identification of user accounts having the priority status.

8. The system of claim 6, wherein the priority status is set for the user account having the priority status by an administrator account of the system.

9. The system of claim 6, wherein the operations further comprise:
determining, by a protocol driver that is configured to process file operations on the group of files, that the user account has requested to access the file; and
in response to successful completion of accessing the file by the user account, setting the external attribute of the file to indicate that the file is the priority file.

10. The system of claim 9, wherein the memory is a first memory, and wherein the protocol driver stores a stored identification of user accounts having the priority status in a second memory of the protocol driver.

11. The system of claim 10, wherein the user account is a first account, and wherein the operations further comprise:
adding, by the protocol driver, an indication of a second user account to the stored identification of the user accounts having the priority status based on the protocol driver receiving a SIGHUP message indicative of adding the second user account.

12. A method, comprising:
based on a node of a group of storage nodes has failed, wherein the group of storage nodes stores files, and wherein respective data protection levels are maintained for respective files of the files, evaluating, by a system comprising a processor, the respective files, comprising, for each file of the respective files:
based on determining that a data protection level for the file is degraded, and in response to determining that the file is a priority file, adding an identifier of the file to a priority table usable to restore data protection, or
based on determining that the data protection level for the file is degraded, and in response to determining that the file is not the priority file, adding the identifier of the file to a non-priority table for usable to restore data protection;
after evaluating the respective files, restoring, by the system, respective first data protection levels of respective first files added to the priority table; and
after restoring the respective first data protection levels of the respective first files, restoring respective second data protection levels of respective second files added to the non-priority table.

13. The method of claim 12, the evaluating for each file further comprising:
setting an external attribute of the system to indicate that the file is the priority file based on the file satisfying an access-frequency criterion.

14. The method of claim 12, wherein the determining that the file is the priority file is performed based on a value of an external attribute of the file that indicates a number of times that the file has been accessed is greater than a threshold number.

15. The method of claim 14, further comprising:
incrementing, by the system, the value of the external attribute based on successfully reading or modifying the file.

16. The method of claim 14, wherein the data protection level is a first data protection level, and further comprising:
setting, by the system, the value of the external attribute to zero based on restoring a second data protection level of the file.

17. A non-transitory computer-readable medium comprising instructions that, in response to execution, cause a system comprising a processor to perform operations, comprising:
based on determining that a node of a group of storage nodes has failed, wherein the group of storage nodes stores files, and wherein respective data protection levels are maintained for respective files of the files, examining the respective files, wherein
based on determining that a corresponding data protection level for a file of the respective files is degraded, and based on determining that the file is a priority file, adding an identifier of the file to a priority group for restoring data protection for priority files, and
based on determining that the corresponding data protection level for the file of the respective files is degraded, and based on determining that the file is not the priority file, adding the identifier of the file to a normal group for restoring data protection for normal files having a lower priority than priority files; and
after examining the respective files, restoring respective first data protection levels of respective first files of the priority group before restoring respective second data protection levels of respective second files of the normal group.

18. The non-transitory computer-readable medium of claim 17, wherein the determining that the file is the priority file comprises:
determining an external attribute of the file indicates that the file is the priority file; or
determining that a number of times that the file has been accessed satisfies an access criterion.

19. The non-transitory computer-readable medium of claim 18, wherein the external attribute is a first external attribute, and wherein a second external attribute identifies the number of times that the file has been accessed.

20. The non-transitory computer-readable medium of claim 17, wherein the determining that the corresponding data protection level for the file of the respective files is degraded comprises:
examining a logical inode that corresponds to the file, wherein the logical inode comprises a data structure that identifies attributes of the file and disk block locations of the file.

* * * * *